United States Patent
Smith et al.

(12)

(10) Patent No.: US 9,660,682 B2
(45) Date of Patent: *May 23, 2017

(54) APPARATUS FOR HOLDING AN ELECTRONIC DEVICE

(71) Applicant: Otter Products, LLC, Fort Collins, CO (US)

(72) Inventors: W. Travis Smith, Fort Collins, CO (US); Peter J. Gronewoller, Fort Collins, CO (US); Carlton R. Lay, Fort Collins, CO (US); Lucas B. Weller, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/340,535

(22) Filed: Nov. 1, 2016

(65) Prior Publication Data
US 2017/0047957 A1 Feb. 16, 2017

Related U.S. Application Data

(63) Continuation of application No. 14/997,738, filed on Jan. 18, 2016, now Pat. No. 9,515,692.

(Continued)

(51) Int. Cl.
*H04M 1/00* (2006.01)
*H04B 1/3827* (2015.01)
(Continued)

(52) U.S. Cl.
CPC ........... *H04B 1/385* (2013.01); *H04B 1/3888* (2013.01); *H04M 1/04* (2013.01); *H04B 2001/3855* (2013.01)

(58) Field of Classification Search
CPC ...................................................... H04B 1/385
(Continued)

(56) References Cited

U.S. PATENT DOCUMENTS 6,616,111 B1   9/2003   White
9,314,078 B1   4/2016   Haymond et al.
(Continued)

OTHER PUBLICATIONS

Different Colors Universal Silicone Rope Sling Phone Case for Smartphone (web page accessed Feb. 2, 2016 at http://www.globalsources.com/gsol/I/Silicone-mobile/p/sm/1127715539.htm#1127715539).

(Continued)

*Primary Examiner* — Sanh Phu

(57) ABSTRACT

A holder for an electronic device includes a body, a first receptacle, and a second receptacle. The body includes a surface, a first end portion, a second end portion, a medial portion, and an attachment mechanism configured for attaching the body to a wearable band. The attachment mechanism includes one or more deformable attachment protrusions configured for insertion into one or more corresponding attachment apertures of the wearable band. The first and second receptacles are each configured for removably retaining the electronic device to the body. The first and second receptacles each define a respective cavity bounded by a stretchable opening. Each opening is configured to receive and retain a respective end of the electronic device as well as ends of other electronic devices having a range of sizes.

20 Claims, 10 Drawing Sheets

Related U.S. Application Data

(60) Provisional application No. 62/104,633, filed on Jan. 16, 2015, provisional application No. 62/142,938, filed on Apr. 3, 2015.

(51) Int. Cl.
*H04M 1/04* (2006.01)
*H04B 1/3888* (2015.01)

(58) Field of Classification Search
USPC .................................................... 455/575.6
See application file for complete search history.

(56) References Cited

U.S. PATENT DOCUMENTS 9,515,692 B2 * 12/2016 Smith .................... H04B 1/385
2013/0001263 A1 1/2013 Kai

OTHER PUBLICATIONS

Universal Bike Phone Mount Holder (web page retrieved on Feb. 3, 2016 from http://www.qy-mobile.com/mobi/car-cradles-mounts/universal-bike-phone-mount-holder-bicycle-handlebar-motorcycle-cell-phone-cradle-adjustable-to-fit-any-smart-phone-iphone-galaxy-nokia-motorola).

* cited by examiner

APPARATUS FOR HOLDING AN ELECTRONIC DEVICE

CROSS-REFERENCE TO RELATED APPLICATIONS

This application is a continuation of co-pending U.S. patent application Ser. No. 14/997,738, filed Jan. 18, 2016, which claims the benefit of U.S. Provisional Patent Application No. 62/104,633, filed Jan. 16, 2015, and U.S. Provisional Patent Application No. 62/142,938, filed Apr. 3, 2015, each of which is incorporated by reference herein.

FIELD

This disclosure relates generally to holders and cradles for use with portable electronic devices.

BACKGROUND

Portable electronic devices, such as smartphones, are often carried by users while exercising to provide audio entertainment, to allow phone calls to be made and received while on-the-go, and even to sense and/or record biometric data. Such portable electronic devices are often worn on a banded holder, such as an armband or belt, while exercising. However, current banded holders suffer from a multiplicity of problems, some of which include adding additional bulk to the actual device the holder carries, a lack of compatibility between devices, and a limited ability to secure devices.

For instance, many banded holders use a rigid or semi-rigid cradle to hold an electronic device. While such rigid or semi-rigid cradles specific to a given device may retain the device effectively, this can come at the cost of additional bulk and weight in the cradle. This excess bulk and weight can be distracting and/or uncomfortable for a user, especially when exercising.

Rigid and semi-rigid cradles also lack compatibility with electronic devices having different sizes and dimensions. Particularly, the portion of the armband or belt that directly holds the portable electronic device is often created with only a single device in mind. Yet there are many different sizes of electronic devices that are available for use by a given user. This diversity of size and shape can make it difficult for accessory manufacturers to produce banded holders that may be used for holding a plurality or all devices. As a result of the absence of a unitary banded holder, users of various devices are often left with orphan devices lacking a compatible banded holder.

Banded holders can also have problems with securing a device effectively, especially if a user tries to use a banded holder that is not specifically made to fit the user's device. Electronic devices larger than the cradle may not fit in a rigid/semi-rigid cradle and thus cannot be secured effectively. Even if the larger devices can be secured by forcing the device into the cradle, additional strain is placed on the cradle, thereby reducing its lifespan. Devices smaller than the cradle may also not be retained effectively, and will move inside the cradle (if they are retained at all).

To solve the issues of device compatibility and bulk, some banded holders use a closeable pocket instead of a cradle. The pocket is usually large enough to hold a variety of devices having various dimensions. While devices smaller than the pocket may be retained in the pocket by a cover with a fastener (e.g. a zipper or strap with hook-and-loop fastener), because of the disparity between the size of the device and the volume of the pocket, the device may still bounce and jostle within the pocket during vigorous movement. Further, movement of the device within a larger pocket may lead to a variety of issues, including causing sliding of the banded holder and/or resulting in noise transduction through the headphone cables, thus detracting from audio enjoyment. This is not only distracting, but may force the user to readjust the position of the banded holder on the user's body. Movement of the device within the large banded holder may also cause accidental activation of the device, as well as user difficulty with accessing a touchscreen or buttons on the device while the device is moving within the banded holder. On the other hand, using a closeable pocket-style carrier to retain a device that is larger than the pocket may lead to failures of the pocket to sufficiently retain the device securely within the pocket, thus leading to the device dropping and/or breaking.

For at least the reasons discussed above, improved banded holders for portable electronic devices are desirable. Accordingly, banded holders for electronic devices, systems including the same, as well as their methods of use are disclosed herein that address these and other such problems.

SUMMARY

The presently disclosed technology provides banded holders for attaching an electronic device to a body part of a user. The banded holders may include a cradle for securing and retaining portable electronic devices and/or wearable bands for comfortably and securely maintaining the cradle and/or portable electronic device on a user's arm, leg, waist, head, or other body part. Therefore, in one aspect, the banded holders presented herein include a cradle that can hold a range of electronic devices, and may further include a wearable band configured for both attaching to a cradle that holds the electronic device, as well as allowing it to be coupled to a secondary object, such as a body part of the device user. The banded holders may include one or a plurality of cradles that are supplied along with the wearable band, such that larger or smaller cradles may be coupled to the wearable band, depending on the size of device to be held. The banded holders may include one or a plurality of straps that are supplied along with the wearable band, such that the wearable band may be attached to user body parts of different circumferences. The wearable band may be thin and flexible to reduce bulk, and may be configured to aid in minimizing movement of the electronic device relative to a user's body when the electronic device is retained within the cradle and the cradle is associated with the wearable band.

In another aspect, the disclosure provides a cradle for securing an electronic device. For instance, the cradle may be configured such that a proximal and/or distal end of the electronic device is secured by first and second receptacles. Particularly, the cradle may include an elongated body and may have a first end portion, a medial portion, and a second end portion surrounded by a circumferential or perimeter portion. In certain instances, the elongated body may be configured to include a first and/or a second receptacle adapted to retain one or more portions of the electronic device. In various embodiments, the first and second receptacles may be positioned on the first and second end portions of the elongated body. The elongated body may be made of an elastomeric material.

The receptacles may each include a retaining surface offset from the surface of the elongated body by two or more extended walls. The plurality of extended walls, retaining surface, and a portion of the elongated body define a cavity of the receptacle. The extended walls may be separated one from the other by the width of the elongated body, such as by being positioned along the perimeter of the elongated body. In various instances, the extended walls can vary in height and/or distance from each other so as to approximate the thickness of the electronic device to be retained within the cavity of the receptacle of the cradle. Accordingly, in some embodiments of the foregoing aspect, at least one of the first and second receptacles may be configured to include at least a first deformable opening, e.g. separate from the aforementioned cavity. The first deformable opening may be adaptable so as to allow the cavity of the receptacle to stretch and accommodate differently-sized ends of electronic devices to be inserted into and secured by the cavity of the receptacle. Likewise, in some embodiments, the elongated body itself may include one or more deformable openings, such as in at least one of the first and/or second end portions to allow the elongated body to stretch and accommodate electronic devices of different dimensions and volumes.

In yet another aspect, the disclosure provides a wearable band for securing a cradle, such as a cradle described above, to an object, such as the body part of a user, while the cradle holds an electronic device. The wearable band may be any suitable element that is capable of being associated with the cradle and adapted to allow the cradle to be coupled in some manner to the object. In various embodiments, the wearable band may have any suitable configuration and may include a strap or a band, so as to attach the wearable band to the body of the object, e.g. a body part of the user.

In certain embodiments, the wearable band may include a base component to stabilize the cradle and the electronic device to the band while attached to a user's body part. The base component may have a first end portion, a second end portion, and a medial portion separating the first and second portions. The base component may be made from a flexible and/or semi-rigid material. In particular instances, the base component may include one or more attachment apertures that correspond with attachment protrusions positioned on the medial portion of the cradle.

In another example, an apparatus or a holder for an electronic device includes a body, a first receptacle, and a second receptacle. The body includes a surface, a first end portion, a second end portion, a medial portion, and an attachment mechanism configured for attaching the body to a wearable band. The attachment mechanism includes one or more deformable attachment protrusions configured for insertion into one or more corresponding attachment apertures of the wearable band. The first and second receptacles are each configured for removably retaining the electronic device to the body. The first and second receptacles each define a respective cavity bounded by a stretchable opening. Each opening is configured to receive and retain a respective end of the electronic device as well as ends of other electronic devices having a range of sizes.

DETAILED DESCRIPTION OF THE DISCLOSURE

Figure 1A:
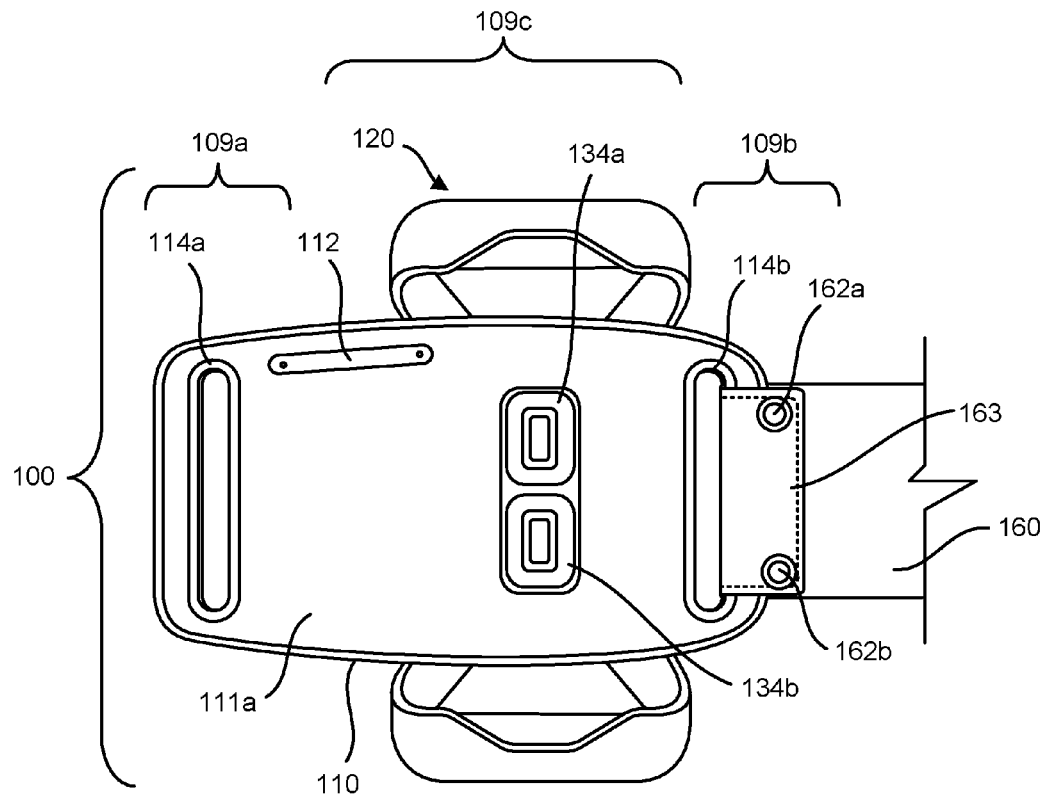
FIG. 1A shows a front view of a portion of a banded holder for an electronic device.

The present disclosure relates generally to a securing apparatus for removably and securely holding and retaining a portable electronic device on an object, such as a body of a user. For instance, an object may form a support which the securing apparatus may be couple. In various instances, the support may be a body part of a user, such as an arm, leg, wrist, ankle, head, neck, or waist of a user. The securing apparatus includes a securing substrate, such as a cradle for securing the electronic device. The securing substrate or cradle may be removably attached to a wearable band for attachment to the object or body part, e.g. an arm, leg, or head. In various instances, the securing substrate or cradle includes an interface that is capable of removably securing and retaining the electronic device, and may be configured such that different sizes of electronic devices may be retained therein. In some instances, the devices may be retained both with and/or without a protective or decorative encasement covering the device.

Electronic devices secured and retained by a securing apparatus and/or cradles of the present technology may include portable electronic devices, such as smartphones, tablets, portable computing devices, portable media players, personal digital assistants, smart watches, portable gaming systems, satellite navigation receivers (e.g. a GPS receiver), and/or fitness monitors and the like. Electronic devices to be secured by cradles described herein may have a variety of shapes and sizes that can be accommodated by a securing apparatus and/or cradle as described in more detail below.

Cradles described herein may be shaped and/or otherwise configured to approximate the shape and/or configuration of the electronic device they are designed to retain. Such cradles, as disclosed herein, may be configured to secure and maintain electronic devices having some variation in their dimensions. For example, different models of the SAMSUNG GALAXY smartphone or the APPLE IPHONE can differ in length, width, and thickness. The difference in length, width, and/or thickness between devices may be about 0.1 mm, about 0.2 mm, about 0.3 mm, about 0.4 mm, about 0.5 mm, about 0.6 mm, about 0.7 mm, about 0.8 mm, about 0.9 mm, about 1.0 mm, about 1.25 mm, about 1.5 mm, about 1.75 mm, about 2.0 mm, about 2.5 mm, and about 3.0 mm. In various instances, such devices may have dimensions less than 0.1 mm or more than 3.0 mm or 4.0 mm. However, the size and shape of the cradle and its various components should be selected to approximate the dimension of the devices that are expected to be used with the banded holder, such that the fit between the two is snug. The cradle should be configured so as to secure the device upon reception within the cradle, but yet be large and/or flexible enough to allow for ease of insertion. For instance, the parameters selected above have been determined to be useful in some instances. For embodiments in which the cradle is made of an elastomeric material (such as silicone), the modulus of elasticity and/or durometer of the elastomeric material may be selected in conjunction with its dimensionality to maximize flexibility and expansiveness, while also ensuring the cradle will effectively retain the desired electronic device.

The cradles described herein may also be used with changes in dimensions of a given electronic device model created by the installation or de-installation of a protective or decorative case. Accordingly, in some embodiments, cradles of this disclosure have an elongated body that may be made of an elastomeric material, such as a silicone polymer, rubber, or other flexible material. Suitable elastomers may be determined by measuring various characteristics of the elastomeric material. For example, an elastomer's modulus and/or limit of elasticity, as well as the elastomer's tendency to return back to its original or rest state after being flexed or stretched, may be taken into consideration when designing the dimensions of the cradle and/or its receptacles.

Various views of an exemplary securing apparatus or banded holder 100 are shown in FIGS. 1A-1D. Banded holder 100 is configured for attachment to a user's limb, such as an arm. FIG. 1A shows a front view of a portion of banded holder 100 for a rectangular electronic device. The surface of banded holder 100 shown in FIG. 1A faces away from a user's limb when secured to the user's limb. Banded holder 100 includes a base component formed as a base component 110 that partially contacts the user's arm.

Cradles disclosed herein may be attached to a wearable band or strap that may be worn by a user or coupled to another object. For example, base component 110 attaches to and stabilizes the cradle 120 against the body part of a user. The base component 110 may be made of a flexible material that has elasticity to accommodate differently-sized body parts or objects, such as a woven or non-woven fabric, or an elastomer such as a rubber, silicone polymer, or neoprene. In some embodiments, base component 110 may be at least partially made of a rigid or semi-rigid material that is secured partially within the flexible material, allowing the cradle to be more easily secured. Base component 110 has a first base end portion 109a, a second base end portion 109b, and a medial base portion 109c that separates the first and second base end portions. The base component also includes a front surface 111a and a rear surface 111b that are defined by a perimeter portion.

Figure 1B:
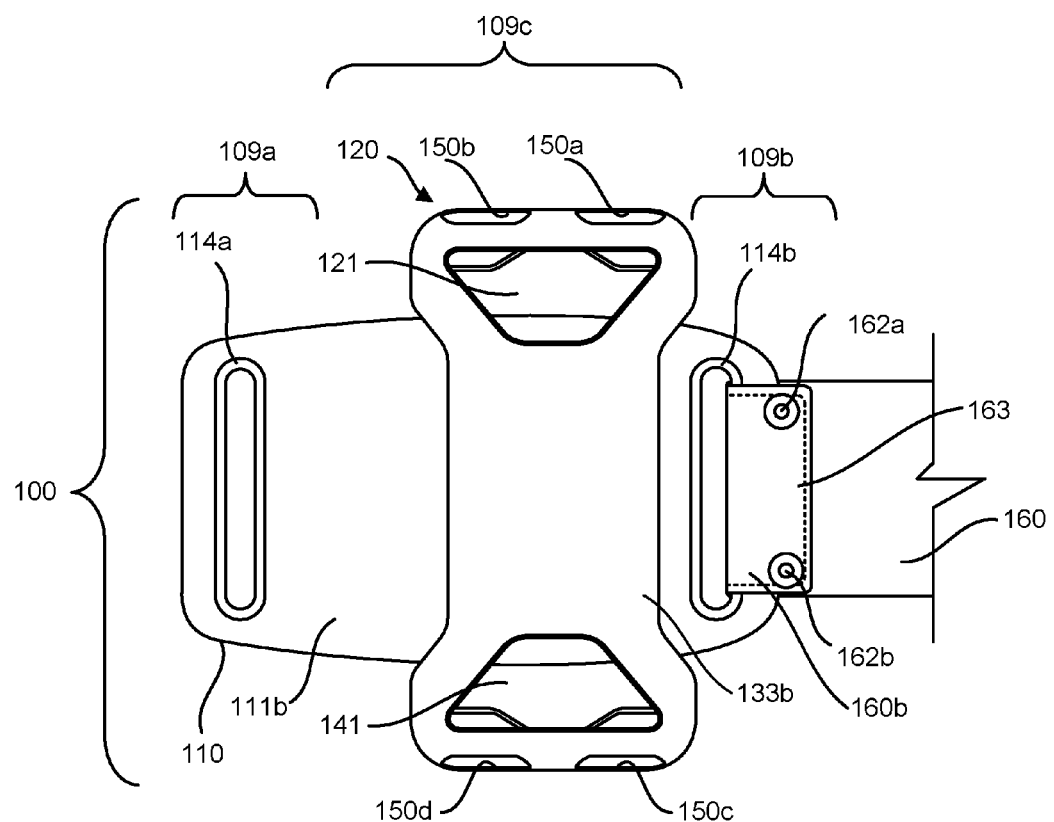
FIG. 1B shows a rear view of a portion of the banded holder for an electronic device depicted in FIG. 1A.

The base component may also be attached to one or more bands or straps that wrap around the body part of a user, such as an arm, leg, head, neck, waist, wrist, ankle, or the like, such as strap 160 of FIGS. 1A-1B. The one or more straps may be separate components that attach to one or more of the first base end portion (e.g. an anterior portion) and the second base end portion (e.g. a posterior portion) of the base component. In some embodiments, the first base end portion may be an anterior end portion that faces towards the anterior (front side) of a user when worn on the side of the user's arm. In some embodiments, the second base end portion may be a posterior end portion that faces towards the posterior (back side) of a user when worn on the side of the user's arm.

In some embodiments, the base component may include a pocket within the flexible material between the front surface and rear surface of the base component. For example, in FIG. 1A, base component 110 includes an opening 112 to a pocket (not visible) that can be used to hold a bundled or coiled cord (such as for portable headphones), keys, or other small items. In certain embodiments of a pocket, opening 112 may include a hook-and-loop fastener on the interior of the pocket and an additional tab proximate the exterior of opening 112 to allow the hook-and-loop fastener to be separated and expand opening 112. In some embodiments of a pocket, a portion of a hook-and-loop fastener may be attached to a length of flexible material on the exterior of base component 110 and proximate opening 112. In such embodiments, a second portion of a hook-and-loop fastener may be positioned proximate opening 112, such that when the hook-and-loop fastener portions are connected, at least a partial barrier to opening 112 is formed, preventing items inside the pocket from coming out. Other fasteners may be utilized to maintain opening 112 in a closed state, such as snaps, buttons, magnets, and the like. In some embodiments, more than one pocket and opening may be added to base component 110. In certain embodiments, a strap 160 attached to the base component 110 may include a pocket. Certain embodiments of the base component may include a plurality of pockets formed in at least one of the base component 110 and the strap 160.

In embodiments of a base component attached to a band or strap, the base component may include first and second slots on respective first and second base end portions of the base component for attaching the strap. For example, in FIGS. 1A-1B, a strap 160 is attached to, but not contiguous with, the base component 110. Base component 110 includes two strap slots 114a and 114b, each positioned on first base end portion 109a and second base end portion 109b, respectively, for attachment of strap 160. Strap 160 has a first strap end portion (not shown), a second strap end portion 160b, and a medial strap portion (not shown). The second end 160b of strap 160 is threaded through strap slot 114b and attached to itself by a combination of rivets 162a-b and thread 163. However, in certain embodiments, strap 160 may be attached directly to base component 110, and not to itself When strap 160 and base component 110 are wrapped around an object or body part, strap 160 can be attached to itself, via a hook-and-loop fastener pair on opposite sides of strap 160. In some embodiments, other types of removable and non-removable attachments for attaching portions of strap 160 to base component 110, or attaching strap 160 to itself may also be utilized. For example, the first and second attachment elements may include hook-and-loop fasteners, reciprocal snaps, buttons and button holes, adhesives, buckles, (e.g. a side release buckle), or other attachment pairs. Different types of attachment pairs may also be used simultaneously to attach the strap to the base component. For example, the second strap end portion may be inserted through the second slot and secured using snaps, and the first strap end portion may be inserted through the first slot and secured using a hook-and-loop fastener. In some embodiments, a friction or compression buckle may be used to fasten the strap and allow removable attachment to a user's body part. A jam lever may be closed to apply compression to the strap within the buckle, and opened to release compression and allow adjustment or removal of the strap.

In some embodiments, strap 160 may be completely removable from base component 110, in such embodiments, multiple removable attachments, e.g. hook-and-loop fastener pairs, are positioned on both ends of strap. Each end of strap 160 is looped through slots 114a-b, and removably attached to itself In other embodiments of a removable strap 160, each end of strap 160 may be removably attached to an end portion of base component 110.

Using two strap slots in combination with a removable strap allows usage of straps with different lengths with the same base component, permitting the banded holder to be attached to a greater variety of limb or object circumferences. If the strap can attach to itself, such as by reciprocal portions of a hook-and-loop fastener on either side of the removable strap, then each end of the strap 160 may be threaded through each slot 114a and 114b. Strap 160 can then be removably attached to itself using the reciprocal hook-and-loop fastener.

In some embodiments, additional slots to the first and second slots may be positioned proximate strap slots 114a-b to allow the circumference of the banded holder to be adjusted for body parts of different circumferences. For example, third, fourth, fifth, sixth, and seventh slots may be positioned proximate the first and second strap slots.

In some embodiments, the base component 110 may include a strap or strap portion that is formed from the same material as the base component 110, and may be contiguous with the first base end portion, the second base end portion of the base component, or both the first and second base end portions. For example, if the first base end portion of the base component has a contiguous strap, the second base end portion may have at least one slot to receive an end of the strap that self-attaches, and vice versa. A base component 110 and strap 160 may be formed from a fabric or an elastomeric material (e.g. silicone, rubber, neoprene, etc.). In some instances, strap 160 may be attached to base component 110 using a method other than self-attachment, such as snapping or fastening directly to base component 110.

Figure 1C:
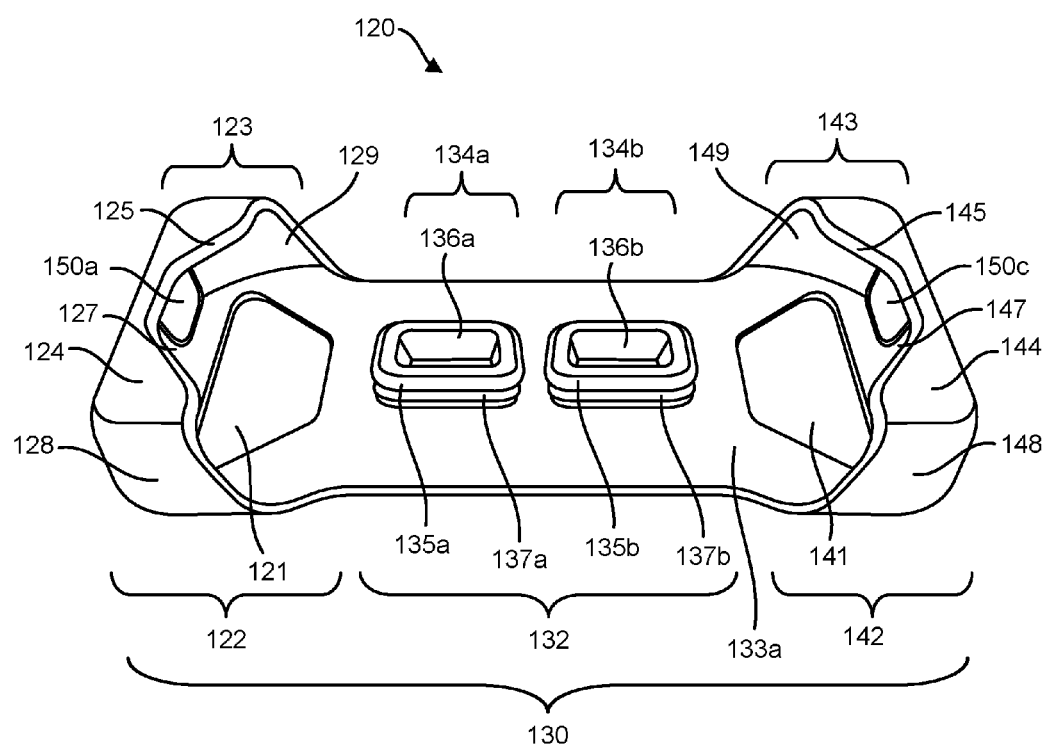
FIG. 1C shows a perspective view of a cradle for a banded holder.

In certain embodiments, at least one of the attachment elements of the cradle may include one or more protrusions that extend beyond the surface of elongated body 130. In such embodiments, the substrate, e.g. a wearable band, may include one or more apertures for receiving the protrusion(s) so as to effectuate coupling between the two. FIGS. 1A and 1C provide exemplary illustrations of attachment protrusions 134a-b on a front surface of device cradle 120. The attachment protrusions 134a-b are used to removably attach device cradle 120 to base component 110. The attachment protrusions 134a-b are pushed through corresponding attachment holes or apertures 116a-b (see also FIG. 1D) of base component 110 from the interior side of banded holder 100 (interior side is shown in FIG. 1B). Attachment protrusions 134a-b secure cradle 120 with base component 110 via attachment apertures 116a-b (see also FIG. 1D).

In certain instances, a separate rigid or semi-rigid element, such as a platform or plate, may be associated with the attachment element of the wearable band so as to provide added rigidity to the more flexible wearable band. In some embodiments, medial portion 132 may include one or more plates to add additional stiffness to cradle 120, attached or adhered to the exterior surface of cradle 120, or within cradle 120. In some instances, cradle 120 may be overmolded over the one or more plates. In some embodiments, the area of the attachment plate may be increased to add additional stiffness to medial portion 132, or decreased to reduce the stiffness of medial portion 132.

The rigid or semi-rigid element can also provide a structure for mounting the cradle to the base component. For example, the rigid or semi-rigid platform may include one or more apertures, having a rigid or semi-rigid border or edge that acts as an engagement element, and may form the engagement element into which the attachment protrusion may be fitted. In addition, the one or more attachment protrusions may include an attachment groove, such as a groove that corresponds with the rigid or semi-rigid engagement element in the attachment aperture of the wearable band. When the attachment protrusion is inserted into the apertures, the groove of the attachment protrusion fits around the rigid edge of the aperture of the platform, thereby ensuring that the cradle is coupled to the wearable band.

For example, base component 110 of FIGS. 1A-1B may include an attachment plate (not visible) contained within the base component that has rigid engagement elements 118a-b (not visible due to coverage by flexible caps 135a-b; see FIG. 1E) in attachment apertures 116a-b. In some embodiments, separate attachment plates with separate rigid engagement elements may be part of base component 110, each attachment plate having attachment apertures 116a-b. Such attachment apertures allow insertion of attachment protrusions of a cradle, as discussed further below.

In certain embodiments, one or more of attachment apertures 116a-b on the base component 110 may be a hole that extends completely through the base component, as shown in FIGS. 1A-B. For example, in FIG. 1D, attachment apertures 116a-b are configured to receive attachment protrusions 134a-b, respectively (see FIG. 1B). Flexible caps 135a-b are accessible through attachment apertures 116a-b when attachment protrusions 134a-b are inserted. In some embodiments, one or more of the attachment apertures may extend only partially through the base component, the cavity of the aperture having a bottom surface. In such embodiments, the bottom surface of an attachment aperture may cover at least a portion of a flexible cap inserted through the attachment aperture.

In some embodiments, the cradle is attached to the base component from a rear surface in order to provide additional security against accidental dislodging the cradle from the base component. For example, FIG. 1B shows a rear view of a portion of banded holder 100 for an electronic device. The surface of banded holder 100 visible in FIG. 1B faces inward and contacts a user's limb. In the embodiment shown in FIGS. 1A and 1B, a front surface 132a (not visible) of device cradle 120 contacts the rear surface of the base component 110. When the banded holder is attached to a limb or object, both the front surface 132a and rear surface 132b of the cradle are pressed in-between the rear surface 111b of base component 110 and the object or limb, providing additional security against cradle 120 detaching from base component 110. However, in other embodiments, attachment protrusions 134a-b may be positioned on the rear surface 132b of cradle 120, such that rear surface 132b faces the front surface 133a of base component 110.

FIG. 1C shows a perspective view of exemplary cradle 120 for banded holder 100, without an associated base component 110, in order to more clearly expose attachment protrusions 134a-b and receptacles 122 and 142. In the embodiment depicted in FIGS. 1A-C, protrusions 134a-b are on a front surface 133a of medial portion 132 that faces the rear surface 111b of banded holder 100, providing additional securing force between a user's arm and base component 110 when a user straps banded holder 100 to a limb. As noted above, in some embodiments, the attachment protrusions 134a-b may be positioned on the rear surface 133b of medial portion 132, allowing cradle 120 to be attached to front surface 111a of stabilization element 110 (the exterior side facing away from the limb or object). In some embodiments, only a single attachment protrusion may be used (see, e.g., FIGS. 2A-2B).

In certain embodiments, an attachment protrusion 134a or 134b may also include a flexible head or cap that is positioned proximate the groove, at the top of the attachment protrusion, farther away from the surface of the elongated body 130. The flexible cap may have a larger area than the area of the attachment aperture, and may be deformable during insertion through the attachment aperture. Thus, when a user inserts the attachment protrusion into the attachment aperture, the flexible cap may be forced through the attachment aperture and then expand upon emerging from the other side of the aperture, further securing the attachment protrusion within the attachment aperture.

For example, attachment protrusions 134*a-b* in FIG. 1C each have a flexible cap or head 135*a-b*. The shape of flexible caps 135*a-b* are similar to that of attachment apertures 116*a-b* (see FIG. 1D); however, the dimensions of apertures 116*a-b* are proportionally smaller than those of flexible caps 135*a-b*. Thus, flexible caps 135*a-b* must be forced through attachment apertures 116*a-b* until flexible caps 135*a-b* emerge on the other side of apertures 116*a-b*. Flexible caps 135*a-b* function similar to mushroom head fasteners and help to prevent the attachment protrusion from being removed from the attachment apertures. In some embodiments, the shape of attachment apertures 116*a-b* and corresponding attachment protrusions 134*a-b* may be polygonal (e.g. triangular, square, pentagonal), round, elliptical, or some irregular shape.

The stiffness and geometry of the flexible caps and the attachment protrusions may be modified by changing the size and number of protrusion cavities 136*a-b*; such modifications may change the force required to remove the attachment protrusions from the attachment apertures. For example, cavities 136*a-b* can be decreased in volume, thus increasing the stiffness of the attachment protrusions. Alternatively, a lattice network of cavities may be formed in cavities 136*a-b* to increase the stiffness of attachment protrusions 134*a-b* while using less material to form the protrusions (see, e.g., single attachment protrusion 234 of FIG. 2A, discussed below).

Returning to the cradle embodiment depicted in FIG. 1C, each of the attachment protrusions 134*a-b* also include an attachment groove. Grooves 137*a-b* each correspond with rigid engagement elements 118*a-b* (see FIGS. 1D-1E). Rigid engagement elements 118*a-b* are positioned on the inner perimeter of attachment apertures 116*a-b* and recessed within apertures 116*a-b*. While rigid engagement elements 118*a-b* are configured here as ridges, in some embodiments, rigid engagement elements 118*a-b* may be configured as bumps or nodules. In some embodiments, rigid engagement elements 118*a-b* may be contiguous around the inner surface of apertures 116*a-b*, or may be formed on only a portion of the inner surface of apertures 116*a-b*.

Figure 1D:
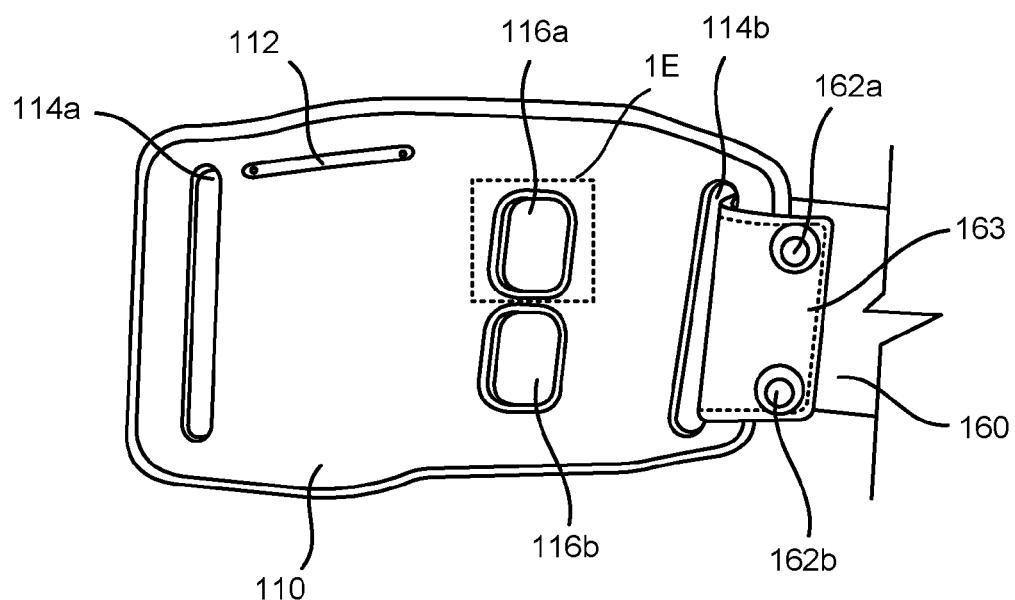
FIG. 1D shows a front view of a banded holder without a cradle.
Figure 1E:
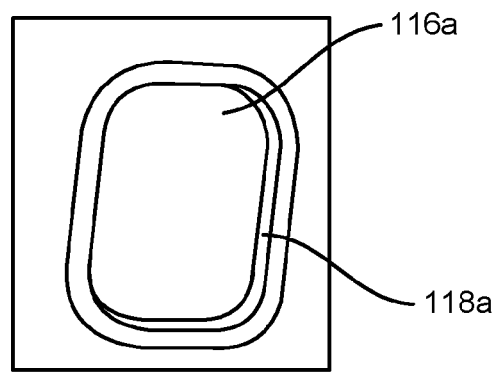
FIG. 1E shows a close-up portion of an attachment aperture of the banded holder in FIG. 1D.

Rigid engagement elements 118*a-b* are configured to interface with attachment ridges 118*a-b* to prevent accidental removal of the cradle 120 from base component 110. Rigid engagement elements 118*a-b* allow the flexible caps 135*a-b* of attachment protrusions 134*a-b* to be at least partially recessed within attachment apertures 116*a-b*, while still securing attachment protrusions 134*a-b* within attachment aperture 116*a-b*. FIG. 1D shows exemplary banded holder 100 without cradle 120, providing a clearer view of attachment apertures 116*a-b*. FIG. 1E is a magnified view of attachment aperture 116*a* (area shown is delineated by Area 1E in FIG. 1D), providing a clearer view of attachment ridge 118*a*. The inclusion of the recessed rigid engagement elements 118*a-b* allows attachment protrusions 134*a-b* to be secured with apertures 116*a-b* while also being recessed within the apertures, thus maintaining a thin profile for the attachment plate and stabilization element. However, in some embodiments, grooves 137*a-b* and corresponding rigid engagement elements 118*a-b* may be thicker, resulting in flexible caps 135*a-b* not be recessed when attachment protrusions 134*a-b* are inserted. In some embodiments, the attachment protrusions 134*a-b* may be positioned on base component 110 and the attachment apertures 116*a-b* may be positioned on medial portion 132 of cradle 120.

In some embodiments, attachment protrusions 134*a-b* may include rigid engagement elements instead of attachment grooves. In such embodiments, attachment apertures 116*a-b* may include recessed attachment grooves that interact with the rigid engagement elements of the attachment protrusion. In some embodiments, the attachment protrusion includes a second groove that engages a second securing mechanism that may be a separate piece from the wearable band. The second groove may be engaged with the second securing mechanism while the first groove engages the engagement element of the wearable band. In some embodiments disclosed herein, the positions of the attachment protrusion and the attachment aperture may be reversed. For example, one or more attachment protrusions 134*a-b* disclosed herein may be positioned on the wearable band, and the corresponding one or more attachment apertures may be positioned on the elongated body 130 of the cradle.

Certain embodiments of cradles described herein may include attachment mechanisms other than one or more attachment protrusions and corresponding attachment aperture(s) for attaching the cradle to a wearable band. For example, the attachment elements may include elements of a hook-and-loop fastener, reciprocal snaps, an adhesive, a screw, a rivet, a clip and a loop, a zipper, a buckle, and a button and hole, and the like. Multiple combinations of attachment mechanisms may be used to attach the cradle to the wearable band, such as a hook-and-loop fastener and reciprocal snaps. The attachment elements allow cradles with different dimensions to be removably secured to the wearable band, depending on the type of electronic device a user wishes to attach to the wearable band.

Cradles described herein are configured to hold and secure an electronic device using receptacles that secure and retain ends of the electronic device. For example, electronic devices secured by a cradle as described herein may be substantially rectangular, for instance having two opposed sides that are longer than the other two opposed sides. The cradle may have receptacles that grasp portions of the device proximate two of the opposed sides.

For example, FIG. 1C provides an illustration of securing portions of a device cradle 120 that includes first and second device securing portions 123 and 143. Cradle 120 has a medial portion 132, as well as a first end portion 122 and a second end portion 142 opposite each other for holding and retaining proximal and distal ends, respectively, of a rectangular portable electronic device. First and second end portions 122 and 142 of the elongated body are separated by medial portion 132. In the embodiment depicted, cradle 120 is made of an elastomeric silicone, although other elastomers may be utilized. Cradle 120 is configured to receive and secure a rectangular electronic device by holding opposing sides in securing portions 123 and 143. Such rectangular devices may have a housing that encloses the electronic components that make up the electronic device.

Rectangular housings may have two ends, e.g. a first end and a second end, that form part of respective proximal and distal portions of the electronic device. A rectangular electronic device may also have first and second sides that are opposite one another, and that separate the first and second ends of the device from each other. Likewise, the first and second ends of the electronic device housing form the third and fourth sides. Similarly, an electronic device housing may be square, such that the first, second, third, and fourth sides are substantially equal to each other. The first, second, third, and fourth sides of rectangular and square electronic devices may be flat, curved, or include multiple flattened surfaces to approximate a rounded side.

Electronic devices described herein may have shapes other than rectangular, and include perimeters that do not include sides and corners. For example, the electronic device may be triangular, pentagonal, hexagonal, etc. If the electronic device is a polygon, the sides of the polygon may or may not be equal in length. The electronic device may also be round or elliptical. The electronic device may also have a combination of flat sides and rounded sides. Electronic devices may also have round, curved, elliptical, oval, or ovoid shapes, alone or in combination with polygonal shapes as described above. Electronic devices with curved shapes may also have sides that are flat, rounded, or a combination of both.

The substrate or cradle has an extended front and back surface to form an elongated body. FIG. 1C shows elongated body 130 with an extended front surface 111a (extended rear surface not visible; see FIG. 1B). The elongated body 130 of the cradle 120 includes a first end portion 122, a second end portion 142, and a medial portion 132 that is positioned in-between the first and second end portions 122 and 142. The cradle 120 has a first receptacle and may have a second receptacle, the one or more receptacles typically positioned on the front surface of the proximal and distal portions of the elongated body. The first and second receptacles act as retaining and securing features of the cradle that secure and retain portions of an electronic device. For example, FIG. 1C provides an illustration of receptacles 123 and 143 of a device cradle 120. Device cradle 120 includes first and second receptacles 123 and 143 that are part of first end portion 122 and second end portion 142, respectively.

Each receptacle of the cradle is adaptable for retaining all or a portion of the electronic device in relation to the surface of the elongated body of the cradle. The receptacle defines a cavity that receives an end or portion of the electronic device. To effectuate receipt and retention of the electronic device, or a portion thereof, each of the receptacles may have a retaining surface that is offset from a surface of the elongated body (e.g. the front or back surface) by one, two, or more extended walls. The extended walls may be positioned opposite each other, and/or proximate each other on different sides, such as at opposite ends of the retaining surface, and may have a length that may or may not be variable to approximate the thickness of the electronic device. Together, the retaining surface and the plurality of extended walls may be configured to define a cavity of each of the device receptacles. In various implementations, the first receptacle retains the first end of the electronic device within the cavity of the first receptacle, while the second receptacle retains the second end of the electronic device within the cavity of the second receptacle. The electronic device is thereby retained within the cradle when the first and second ends of the electronic device are inserted into the respective cavities of the first and second receptacles.

For example, referring to FIG. 1C, receptacle 123 has a retaining surface 124, and extended walls 127, 128 and 129, forming a cup or receptacle for an end of a portable electronic device. A cavity within receptacle 123 is defined by retaining surface 124, extended wall portions 127, 128, and 129, and a portion of front surface 133a. Similarly, second securing portion 143 also includes a retaining surface 144, extended walls 147, 148, and 149, forming a cup or receptacle for another end of a portable electronic device. In certain embodiments, extended walls 127 and 147 may not be present, with only retaining surface 144, rear portion, and opposing side portions acting to secure an end of a device.

In some embodiments, a receptacle may be formed by attaching a retaining surface 124 or 144 directly to a proximal or distal portion of the elongated body, without the presence of extended walls 127, 128, 129, 147, 148, and 149. In such embodiments, the perimeter edges of the retaining surface meet the edges of the elongated body, without interposed extended walls. This may be done to provide a cavity with a smaller volume to increase the retention ability of the receptacle, or to conform more closely to a geometry of a particular electronic device.

Using an elastomeric material to form the receptacles is desirable in order to secure and maintain portions of an electronic device while still allowing an individual cradle to work with electronic devices of varying sizes. In certain instances, the cavities of each of the cradle receptacles has a respective volume that varies with a volume of the ends of the electronic device to be received within the cavity. As indicated above, this volume may be selected so as to allow a portion of the electronic device to be received therein and removed therefrom, while maintaining a snug retaining force in relation to the electronic device. Accordingly, when a proximal or distal end of an electronic device is inserted into the first or second receptacle, the receptacle expands in volume to retain the end of the device within its respective cavity. The change in cavity volume of the receptacles may be accompanied by an increase in the surface area of portions of the receptacle that define the receptacle cavity.

Thus, different devices having different volumes and dimensions may be secured by the same cradle, as a result of the ability of the bounds of the cavity to expand and contract around the given electronic device portion to be received and retained. In some embodiments, the receptacles of the cradle are co-extensive with the elongated body of the cradle, and may include the same elastomeric material that is used to form the elongated body.

In order to help control and balance the ability of a cradle receptacle to secure a portion of an electronic device, one or more deformable openings may be added to the receptacle. The deformable opening allows the cavity of the receptacle to stretch and deform to accommodate variably-sized end portions of electronic devices inserted into the cavity of the receptacle. The absence of material in the opening(s) allows the receptacle to have even more stretchability and/or reduce the amount of force required to stretch the receptacle to a given size. For example, in the embodiment shown in FIG. 1C, extended walls 127 and 147 have deformable apertures 150a-d to allow first and second securing portions 123 and 143 increased flexibility to expand and hold device end portions of different thicknesses, as well as allow access to speaker, microphone, and/or electrical jack ports in the electronic device while the device is retained in the cradle. However, in some embodiments, one or more of such port apertures may not be present. Retaining surfaces 124 and 144 also have cutaways 125 and 145 to permit access to buttons on the electronic device, although some embodiments may not include such cutaways. In some embodiments, each of the first and second receptacles may include a deformable opening. In certain embodiments, at least one of the first and second receptacles may include more than one deformable opening.

Deformable openings may also be included in the elongated body in order to facilitate a cradle's ability to secure electronic devices of different sizes. Deformable openings allow the elongated body to deform and stretch in order to accommodate electronic devices of differing lengths and sizes that are insertable into the receptacle cavity of a cradle. For example, due to the presence of one or more deformable openings in the elongated body, a portion of the elongated body may be able to increase in length and/or width by about 0.1 mm, about 0.2 mm, about 0.3 mm, about 0.4 mm, about 0.5 mm, about 0.6 mm, about 0.7 mm, about 0.8 mm, about 0.9 mm, about 1.0 mm, about 1.25 mm, about 1.5 mm, about 1.75 mm, about 2.0 mm, about 2.5 mm, and about 3.0 mm. Thus, in certain embodiments, at least one of the proximal and distal portions of the elongated body include multiple deformable openings to allow the elongated body to deform and accommodate electronic devices of differing dimensions, e.g. different sizes and/or volumes.

For example, as shown in FIGS. 1A-1C, first end portion 122 and second end portion 142 also include deformable openings, shown as holes or apertures 121 and 141. Holes 121 and 141 are openings or apertures that result in the removal of material near securing portions 123 and 143 and allow increased flexibility on an axis between opposing side portions 128-129 and 148-149, as well as flexibility on an axis between first end portion 122 and second end portion 142. Thus, a certain range of electronic devices having different sizes may be secured in the cradle without removing the cradle (for example different brands or types of smartphones, or electronic devices with or without a case). The area and shape of holes 121 and 141 may be varied depending on the flexibility of the material utilized.

Cradle retaining features, such as receptacles, may be formed and configured to interact with non-rectangular ends of an electronic device. For instance, if the electronic device has a triangular shape, the first receptacle may secure a proximal corner of the electronic device, while the second receptacle may secure the distal two corners. If the electronic device has a pentagonal shape, the first receptacle may retain one, two, or three corners, while the second receptacle retains the remaining two corners of the electronic device. In a similar manner, a device of any shape may be accommodated within a cradle of the disclosure. For example, if the electronic device has a hexagonal shape, the first receptacle may retain two, three, or four corners of the electronic device, while the second receptacle retains the remaining four, three, or two corners, respectively, of the electronic device. If the electronic device is round, the first receptacle may retain a first portion of the circular device, while the second receptacle retains a second portion of the circular device that is opposite the first portion. If the electronic device is elliptical, the ellipse shape has a major axis and a minor axis. The first receptacle may retain a first portion of the electronic device at one end of the major axis, and the second receptacle may retain a second portion of the electronic device at the other end of the major axis. Similarly, if the electronic device is oval or ovoid in shape, the device has a major axis, and the first receptacle may retain a first portion of the electronic device at one end of the major axis, and the second receptacle may retain a second portion of the electronic device at the other end of the major axis.

Cradles and wearable holders disclosed herein may be configured to secure non-rectangular electronic devices. For example, securing regions 123 and 143 may be configured to hold the extremities of devices having a variety of shapes, including devices that are triangular, square, round, elliptical, or some other combination of non-uniform shapes. For instance, if the electronic device has a triangular shape, the first receptacle may secure a proximal corner of the electronic device, while the second receptacle may secure the distal two corners. If the electronic device has a pentagonal shape, the first receptacle may retain one, two, or three corners, while the second receptacle retains the remaining two corners of the electronic device.

In a similar manner, a device of any shape may be accommodated within a cradle of the disclosure. For example, if the electronic device has a hexagonal shape, the first receptacle may retain two, three, or four corners of the electronic device, while the second receptacle retains the remaining four, three, or two corners, respectively, of the electronic device. The receptacle may be configured to conform to an end of the If the electronic device is round, the first receptacle may retain a first portion of the circular device, while the second receptacle retains a second portion of the circular device that is opposite the first portion. If the electronic device is elliptical, the ellipse shape has a major axis and a minor axis. The first receptacle may retain a first portion of the electronic device at one end of the major axis, and the second receptacle may retain a second portion of the electronic device at the other end of the major axis. Similarly, if the electronic device is oval or ovoid in shape, the device has a major axis, and the first receptacle may retain a first portion of the electronic device at one end of the major axis, and the second receptacle may retain a second portion of the electronic device at the other end of the major axis.

In certain embodiments, rectangular electronic devices (and any polygonal electronic device with corners) have corners, and in various instances the corners may be shaped such that they may be rounded, or may include multiple flattened surfaces to approximate a rounded corner. Together, the first and second ends, and first and second sides define a front surface (e.g. where a touchscreen, capacitive touchscreen, interactive control panel, or other display is positioned) and a back surface of the electronic device.

The orientation of an electronic device secured in cradles described herein may be defined by the relationship between the proximal and distal ends of the elongated body. In various instances, the elongated body may be planar having a substantially flat elongated body with the front and back surfaces positioned opposite each other and being substantially parallel to one another.

However, in certain embodiments, one surface of the elongated body may have a proximal and distal surface that includes a ramp or other sloped region on one surface with respect to the other surface of the elongated body that positions a retained electronic device at an angle relative to the opposite surface of the elongated body. In such instances, the receptacles (e.g. positioned on each of the respective ramp surface portions) may be formed and positioned to replicate the angle of the ramp or sloped region. Ramps may be useful in some instances, depending on the use of the electronic device and where the cradle is worn. For example, a device having a display may be viewed more easily by a user if the display is tilted towards the user. This allows the user to more easily and quickly glance at the screen while leaving the cradled device in place, and not having to contort the arm to view the screen.

In various instances, the ramp may be configured as a bend, such as a bend in the medial portion of the elongated body that creates an angle between the proximal and distal surface. In such instances, the angle of the ramp may be anywhere from about 1 degree to about 179 degrees in the positive or negative direction. In certain instances, the angle of the front surface may be from about 1 to 90 degrees with respect to either the distal end and/or proximal end and a normal vector extending away from the medial portion of the cradle. In various instances, the angle may be between about 10 degrees and about 30 degrees, or between about 15 degrees and about 40 degrees, including about 20 or about 25 degrees. In certain instances, the angle may be a curve, e.g., measured from end to end, with a radius between 1 and 180 degrees or somewhere in-between.

Figure 2A:
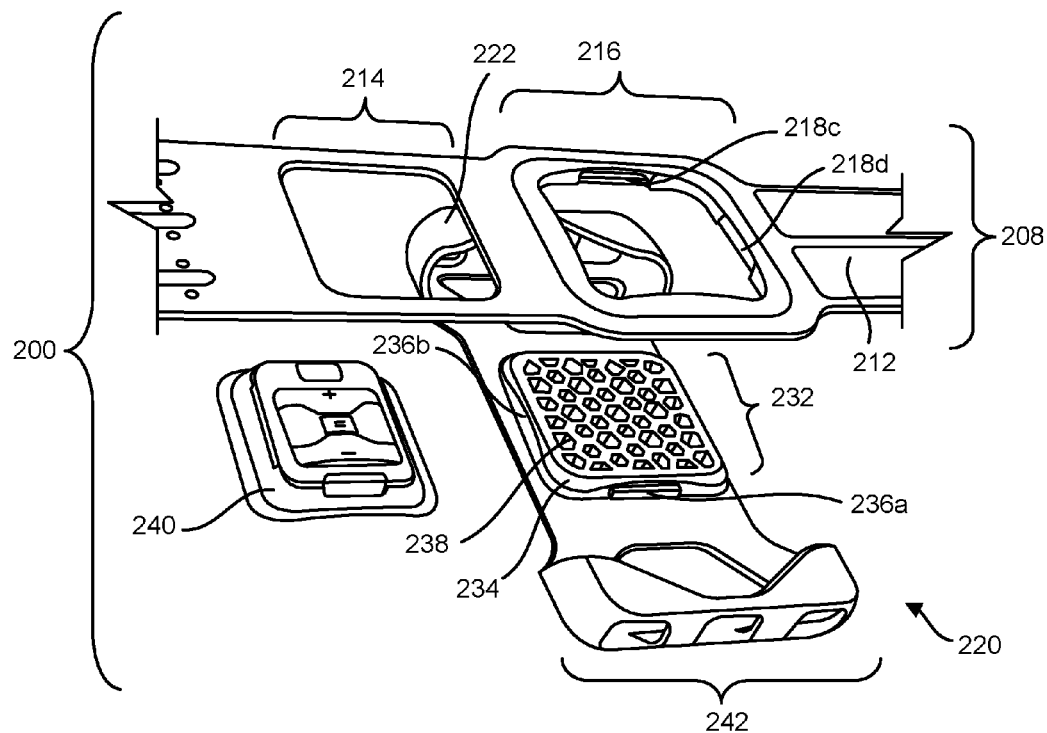
FIG. 2A shows a perspective view of an exploded banded holder.
Figure 2B:
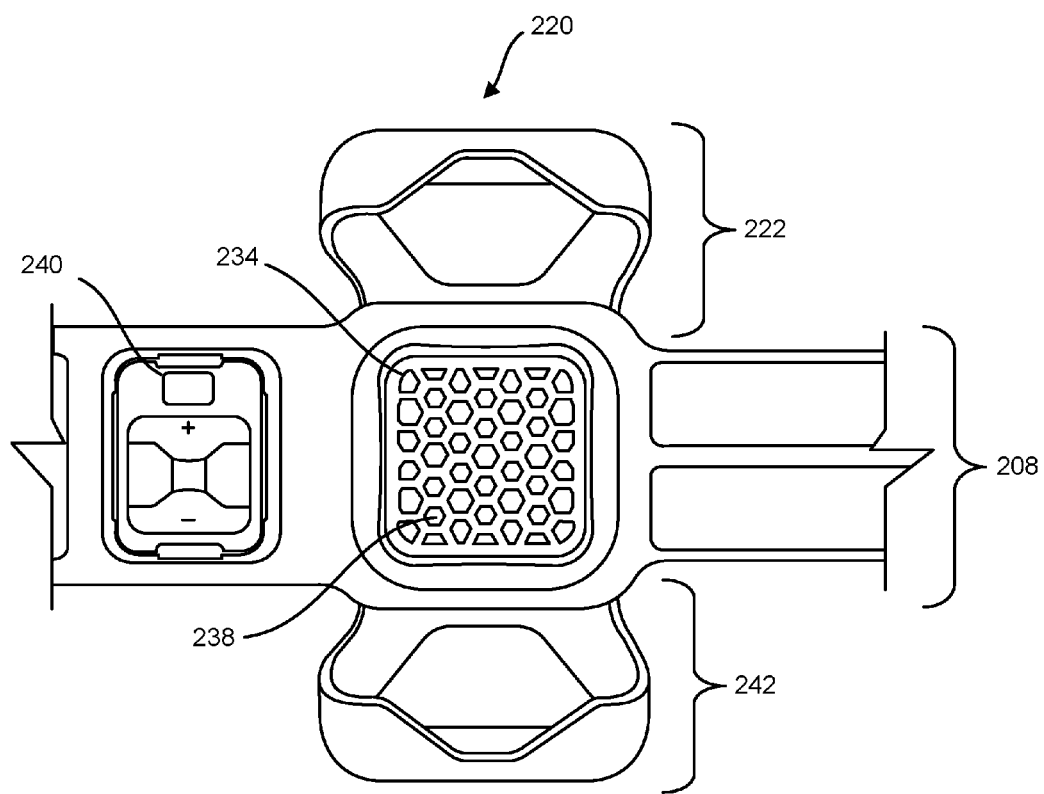
FIG. 2B shows a front plan view of the unexploded banded holder of FIG. 2A.

The wearable holder and cradle embodiments depicted in FIGS. 1A-1B utilize an attachment feature with two attachment protrusions that are secured in corresponding apertures in a base component. However, in certain embodiments, a single large attachment protrusion may be utilized instead. For example, FIG. 2A shows an exploded perspective view of another embodiment of a banded holder 200 with a cradle 220 attached to band 208. FIG. 2B shows an unexploded front plan view of banded holder 200. Cradle 220 is similar to that of cradle 120 above, having a first end region 222, a second end region 242, and a medial region 232. However, cradle 220 includes a single large attachment protrusion 234. Attachment protrusion 234 attaches to banded holder 200 by insertion into cradle attachment aperture 216. Once inserted, attachment protrusion 234 extends through cradle attachment aperture 216 to secure cradle 220 with band 208. As described above, attachment aperture 216 may include a bottom surface that covers at least a portion the inserted protrusion.

As shown in FIGS. 2A-2B, attachment protrusion 234 has a lattice network or honeycomb-style structure 238 to reduce the amount of material forming attachment protrusion 234, while also providing some structure and stiffness. The lattice network 238 may also be used to change the flexibility of attachment protrusion 234. Increasing the sizes of the cavities in lattice network 238 reduces the stiffness of attachment protrusion 234 and increases its flexibility, while decreasing the sizes of the cavities in lattice network 234 increases the stiffness of attachment protrusion 234 and decreases its flexibility.

Banded holder 200 utilizes only a single band 208, to which cradle 220 and accessory device 240 (discussed further below) are attached, and does not include a separate band and base component. However, in some embodiments, a separate base component and strap may be used (see banded holder 100 above).

Attachment protrusion 234 does not have a flexible cap or head (for instance, see FIG. 1C), although such flexible cap may be added (see above and FIGS. 1A-1C). Instead, flexible securing projections 236a-d extend outward from the sides of attachment protrusion 234. Each of the securing projections 236a-d are configured as slightly curved bars, however they may have a variety of configurations, including straight bars, rectangles, or other polygons. In some embodiments, each side of attachment protrusion 234 includes two or more smaller protrusions shaped as domes, polygons, etc.

Each of the securing projections 236a-d correspond with securing cavities 218a-d on the interior surface of attachment aperture 216, such that when a user presses attachment protrusion 234 into cradle attachment aperture 216, securing projections 236a-d are seated in respective securing cavities 218a-d. In some embodiments, securing projections may be positioned on the inner surface of attachment aperture 216 and corresponding securing cavities may be positioned on the sides of attachment protrusion 234. In certain embodiments, a combination of securing projections and cavities may be positioned on the inner surface of attachment aperture 216, as well as attachment aperture 216.

In some embodiments, the base component may include an accessory aperture to receive an electronic accessory, such as a device that combines one or more biometric sensors or a wired or wireless communication device to control the electronic device secured within the cradle. The accessory aperture may also be positioned on the strap of the wearable band. For example, in FIGS. 2A-2B, electronic accessory device 240 is positioned near the banded holder and may be one or more of a wireless or wired control unit, a wireless or wired data collection or sensor unit, and/or a wireless or wired power supply.

Electronic accessories may be removably attached to a band or base component using one or more attachment protrusions and apertures as described above, or they may be non-removably attached using adhesive, sewing, or other types of attachment. For example, In FIG. 2A, accessory device 240 is shown as snapping into accessory aperture 214; however, in some instances, accessory device 240 may be attached to accessory aperture 214 using one or more of an adhesive, sewing, hook-and-loop fastener, or other attachment mechanism. Some embodiments of the accessory device and aperture may use an attachment scheme such as that shown in FIG. 2C and disclosed above. For example, the accessory aperture may have a ridge on at least part of an inner surface of the accessory aperture. The ridge of the accessory aperture interfaces with a corresponding groove on a perimeter of the electronic accessory. The ridge and corresponding groove may be positioned on a part or all of the perimeter of the accessory and the perimeter of the accessory aperture. In some embodiments, the ridge and corresponding groove may be switched with each other, so that the accessory aperture has a groove on at least part of an inner surface of the accessory aperture and interfaces with a corresponding ridge on at least a portion of the perimeter of the electronic accessory. The accessory aperture may have both grooves and ridges to interface with corresponding ridges and grooves, respectively, on the perimeter of the accessory aperture. In some embodiments, the accessory may be surrounded by a separate perimeter shell. The separate perimeter shell allows the accessory to be inserted into the accessory aperture, and may be removable from the electronic accessory.

Figure 2C:
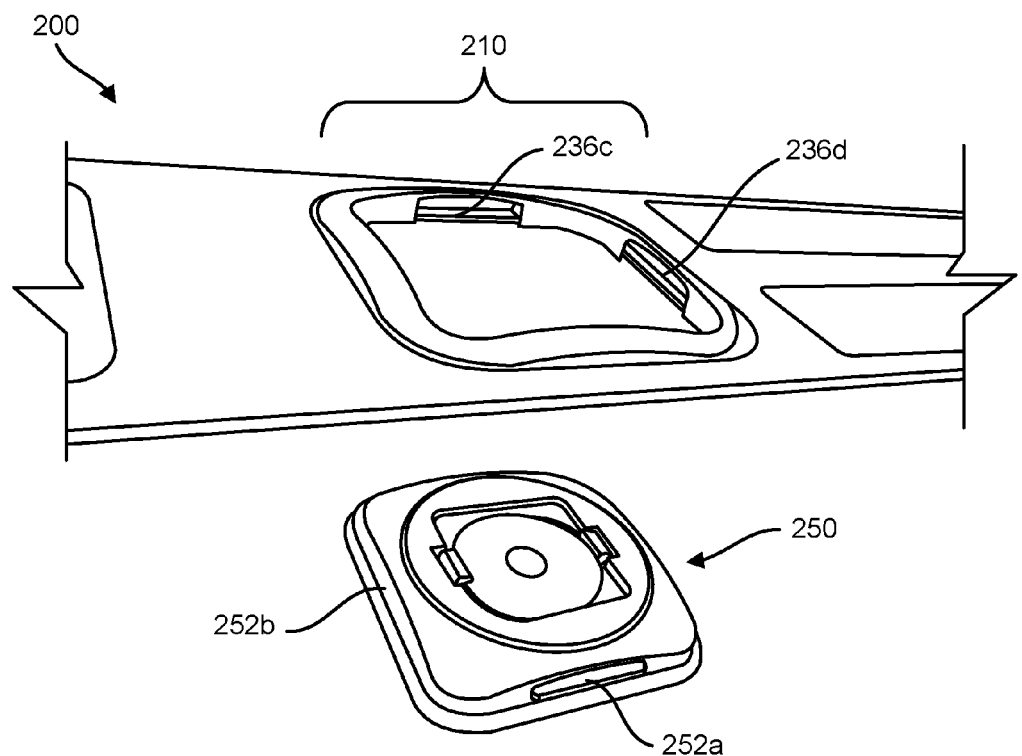
FIG. 2C shows a perspective view of a band and mount module.

In some embodiments, other modules may be removably attached to attachment aperture 216, instead of a cradle 220. For example, FIG. 2C shows an exploded perspective view of band 208 with a mount module 250. In this embodiment, mount module 250 includes attachment protrusions 252a-d (252a-b not visible) to interface with securing cavities 218a-d of attachment aperture 216. Mount module 250 includes a releasable mount mechanism. In one example, the releasable mount mechanism may be similar to that described in U.S. Pat. Pub. No. 2014/0265765, incorporated herein by reference. The mount mechanism can grasp a cleat on an item, such as a smartphone or smartphone case, and release the cleat by twisting the mount mechanism and cleat together.

Figure 3A:
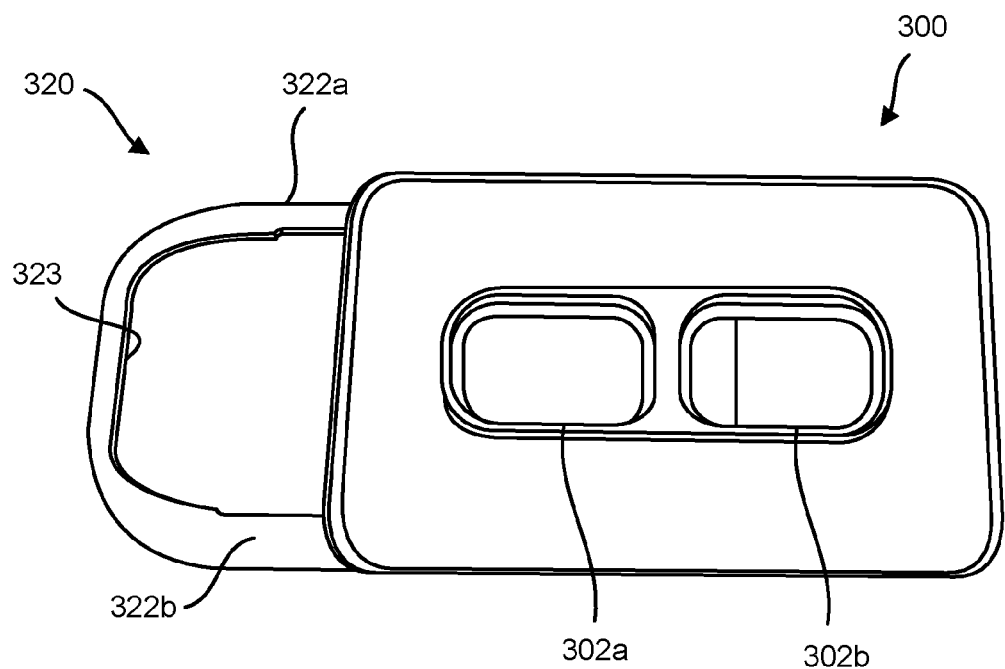
FIG. 3A shows a front view of a cleat plate and cleat slot that can hold a cradle.
Figure 3B:
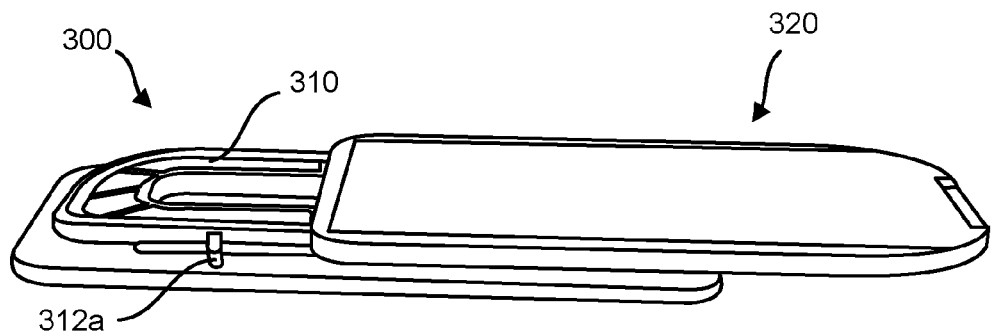
FIG. 3B shows a side view of the cleat plate and cleat slide in FIG. 3A.

Cradles described herein may be attached to objects and items other than banded holders. One such attachment mechanism is a cleat plate that can removably slide in and out of a cleat holder having a slot that retains the cleat. For example, FIG. 3A shows a cleat plate 300 with attachment apertures 302a and 302b that can receive attachment protrusions such as those described above in FIGS. 1A-1D. Cleat plate 300 is partially inserted into a cleat holder 320. FIG. 3B is a perspective view of another side of cleat plate 300 and cleat holder 320, showing cleat 310 partially inserted into cleat slot 323. Cleat slot 323 is defined by cleat overhangs 322a and 322b. Cleat 310 interfaces with slot overhangs 322a and 322b (visible in FIG. 3A), allowing cleat 310, associated cleat plate 300, and a cradle to be secured thereto.

Figure 3C:
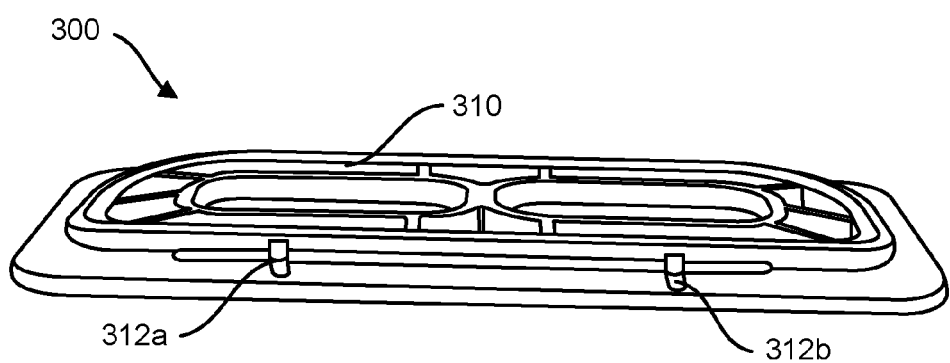
FIG. 3C shows a side view of only the cleat plate in FIG. 3A.
Figure 3D:
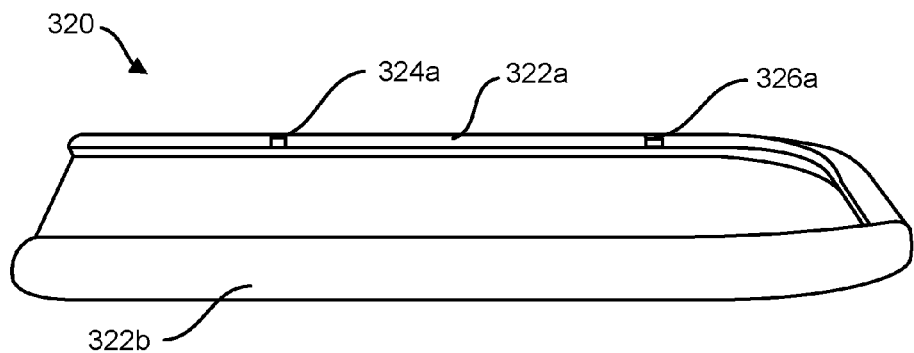
FIG. 3D shows a side perspective view of the cleat slot of FIG. 3A without an associated cleat plate.
Figure 3E:
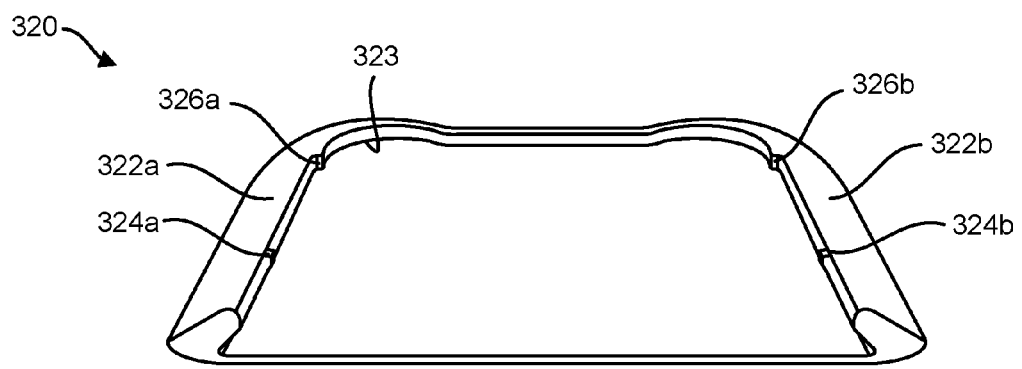
FIG. 3E is a perspective view of the opening of the cleat slot of FIG. 3A.

Cleat plate 300 may be removably retained in cleat holder 320 by reciprocal protrusions on both cleat plate 300 and cleat slot 323. FIG. 3C shows a side view of cleat plate 300 without an associated cleat holder, and FIG. 3D shows a side perspective view of cleat holder 320 without an associated cleat plate. FIG. 3E shows a perspective view of the opening of cleat slot 320. Slot overhangs 322a-b of cleat holder 320 also include slot retention barriers 324a-b that interact with corresponding cleat retention barriers 312a-d underneath cleat 310. As cleat 310 is slid into cleat slot 323, slot retention barriers 324a-b provide resistance against the cleat retention barriers 312a-d (cleat barriers 312c and d not visible), such that additional force is required to continue sliding cleat 310 into place. Slot overhangs 322a-b also include slot stops 326a-b that extend underneath cleat 310 to interact with cleat retention barriers 312b and 312d and aid in preventing cleat 310 sliding past the bottom of cleat slot 320.

In certain embodiments, attachment types other than (or in addition to) the protrusions and cavities descried herein may be used to attach cradles to bands of material while maintaining a thin profile, such as hook-and-loop fasteners. In some embodiments, the cradle may include arms that extend from the medial portion of the cradle, with openings to receive a band of material (similar to openings 114a-b in FIGS. 1A-B).

The above figures and description may depict exemplary configurations for an apparatus of the disclosure, which is done to aid in understanding the features and functionality that can be included in the housings described herein. The apparatus is not restricted to the illustrated architectures or configurations, but can be implemented using a variety of alternative architectures and configurations. Additionally, although the apparatus is described above in terms of various exemplary embodiments and implementations, it should be understood that the various features and functionality described in one or more of the individual embodiments with which they are described, but instead can be applied, alone or in some combination, to one or more of the other embodiments of the disclosure, whether or not such embodiments are described and whether or not such features are presented as being a part of a described embodiment. Thus the breadth and scope of the present disclosure, especially in any following claims, should not be limited by any of the above-described exemplary embodiments.

The contents of the articles, patents, and patent applications, and all other documents and electronically available information mentioned or cited herein, are hereby incorporated by reference in their entirety to the same extent as if each individual publication was specifically and individually indicated to be incorporated by reference. Applicants reserve the right to physically incorporate into this application any and all materials and information from any such articles, patents, patent applications, or other physical and electronic documents.

Terms and phrases used in this document, and variations thereof, unless otherwise expressly stated, should be construed as open ended as opposed to limiting. As examples of the foregoing: the term "including" should be read to mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. Additionally, where a range is set forth, the upper and lower limits of the stated range include of all of the intermediary units therein. The term "about" as used herein in reference to quantitative measurements, refers to the indicated value plus or minus 10%.

The foregoing description is intended to illustrate but not to limit the scope of the disclosure, which is defined by the scope of the appended claims. Other embodiments are within the scope of the following claims.

What is claimed:

1. An apparatus for removably attaching an electronic device to a user of the electronic device, the electronic device having a first end and a second end, the apparatus comprising:
    a wearable band including one or more attachment apertures; and
    a holder comprising:
        a body comprising an elastomeric material, the body having a surface including a first end portion, a second end portion, and a medial portion separating the first end portion from the second end portion, the medial portion including an attachment mechanism configured for removably attaching the body to the wearable band, the attachment mechanism including one or more attachment protrusions each extending above the surface of the body and configured for insertion into the one or more corresponding attachment apertures of the wearable band for attaching the body to the wearable band; and
    a first receptacle and a second receptacle configured for removably retaining the electronic device to the body, the first and second receptacles positioned at the first and second end portions of the body, respectively, the first receptacle configured for removably retaining the first end of the electronic device, the second receptacle configured for removably retaining the second end of the electronic device, each of the first and second receptacles including a stretchable opening configured to receive and retain a respective one of the first and the second ends of the electronic device and further configured to accommodate differently-sized ends of other electronic devices.

2. The apparatus of claim 1 wherein at least one of the one or more attachment protrusions comprises the elastomeric material of the body.

3. The apparatus of claim 1 wherein at least one of the one or more attachment protrusions includes an attachment groove that corresponds with a rigid engagement element of the corresponding attachment aperture of the wearable band for securing the holder to the wearable band when the at least one of the one or more attachment protrusions is inserted into the corresponding attachment aperture.

4. The apparatus of claim 1 wherein at least one of the attachment protrusions includes at least one ridge that corresponds with a groove in a rigid engagement element of the corresponding attachment aperture of the wearable band for securing the holder to the wearable band when the at least one of the one or more attachment protrusions is inserted into the corresponding attachment aperture.

5. The apparatus of claim 1 wherein at least one of the one or more attachment protrusions includes a flexible cap positioned at an end of the at least one of the one or more attachment protrusions, the flexible cap configured to deform when inserted through the corresponding attachment aperture in the wearable band, the flexible cap configured to expand after insertion through the corresponding attachment aperture to further secure the holder to the wearable band.

6. The apparatus of claim 1 wherein the wearable band includes a strap configured for removably attaching the apparatus to the user.

7. The apparatus of claim 6 wherein the strap includes an adjustment feature configured for adjusting a circumference of the strap.

8. The apparatus of claim 7 wherein the adjustment feature of the strap includes one or more of: hook-and-loop fasteners, reciprocal snaps, buttons and button holes, and a clip and loop.

9. The apparatus of claim 1 further comprising a storage pocket.

10. The apparatus of claim 1 further including an accessory aperture configured for removably retaining an accessory used with the electronic device.

11. The apparatus of claim 1 further including a second attachment mechanism configured for removably attaching an accessory to the apparatus.

12. A holder for removably retaining an electronic device, the electronic device having a first end and a second end, the holder comprising:
   a body having a surface including a first end portion, a second end portion, and a medial portion separating the first end portion from the second end portion, the medial portion including an attachment mechanism configured for attaching the body to a band wearable by a user of the electronic device, the attachment mechanism including one or more deformable attachment protrusions extending beyond the surface of the body and configured for insertion into one or more corresponding attachment apertures of the wearable band for attaching the body of the holder to the wearable band; and
   a first receptacle and a second receptacle each configured for removably retaining the electronic device to the body of the holder, the first and the second receptacles each positioned at the first and second end portions of the body of the holder, respectively, the first receptacle configured for removably retaining the first end of the electronic device, the second receptacle configured for removably retaining the second end of the electronic device, the first receptacle and the second receptacle each defining a respective cavity bounded by a stretchable opening, each opening configured to receive and retain a respective one of the first and the second ends of the electronic device, each stretchable opening also configured to receive and retain ends of other electronic devices having sizes spanning a range of sizes.

13. The holder of claim 12 wherein at least one of the one or more deformable attachment protrusions includes an attachment groove that corresponds with a rigid engagement element of the corresponding attachment aperture of the wearable band for securing the holder to the wearable band when the at least one of the one or more attachment protrusions is inserted into the corresponding attachment aperture.

14. The holder of claim 12 wherein at least one of the deformable attachment protrusions includes at least one ridge that corresponds with a groove in a rigid engagement element of the corresponding attachment apertures of the wearable band for securing the holder to the wearable band when the at least one of the one or more deformable attachment protrusions is inserted into the corresponding attachment aperture.

15. The holder of claim 12 wherein at least one of the one or more deformable attachment protrusions includes a flexible cap positioned at an end of the at least one of the one or more deformable attachment protrusions, the flexible cap configured to deform when inserted through the corresponding attachment aperture in the wearable band, the flexible cap configured to expand after insertion through the corresponding attachment aperture to further secure the holder to the wearable band.

16. The holder of claim 12 wherein the body, the first receptacle, and the second receptacle are formed from a same elastomeric material.

17. The holder of claim 12 further including an accessory aperture configured for removably retaining an accessory used with the electronic device.

18. The holder of claim 12 further including a second attachment mechanism configured for removably attaching an accessory to the holder.

19. An apparatus for removably retaining an electronic device, the electronic device having a first end and a second end, the apparatus comprising:
   a wearable band;
   a body having a first end portion, a second end portion, and a medial portion separating the first end portion from the second end portion, the medial portion including an attachment mechanism configured for attaching the body to the wearable band, the attachment mechanism including one of attachment protrusions and attachment apertures, wherein each attachment protrusion is configured for insertion into a corresponding one of the attachment apertures for attaching the body of the apparatus to the wearable band, wherein the wearable band includes the other of the attachment protrusions and the attachment apertures;
   a first receptacle; and
   a second receptacle, the first and the second receptacles configured for removably retaining the electronic device to the body of the apparatus, the first and the second receptacles each positioned at the first and second end portions of the body of the apparatus, respectively, the first receptacle configured for removably retaining the first end of the electronic device, the second receptacle configured for removably retaining the second end of the electronic device, each of the first and second receptacles including a stretchable opening configured to receive and retain a respective one of the first and the second ends of the electronic device.

20. The apparatus of claim 19 wherein the attachment protrusions each include a flexible cap positioned at an end of the respective attachment protrusion, each flexible cap configured to deform when inserted through the corresponding attachment aperture, the flexible cap configured to expand after insertion through the corresponding attachment aperture to removably retain the body to the wearable band.

* * * * *